United States Patent [19]

Weiner

[11] Patent Number: 4,505,969

[45] Date of Patent: Mar. 19, 1985

[54] ORIENTED POLYPROPYLENE WITH LINEAR LOW DENSITY POLY-ETHYLENE COPOLYMER COATING

[75] Inventor: Milton L. Weiner, Rochester, N.Y.

[73] Assignee: Mobil Oil Corporation, New York, N.Y.

[21] Appl. No.: 347,213

[22] Filed: Feb. 9, 1982

Related U.S. Application Data

[63] Continuation of Ser. No. 65,773, Aug. 13, 1979, abandoned, which is a continuation-in-part of Ser. No. 860,350, Dec. 14, 1977, abandoned.

[51] Int. Cl.³ ............................................. B32B 27/08
[52] U.S. Cl. ............................... 428/213; 156/244.11; 428/35; 428/516; 428/349; 526/96
[58] Field of Search ............... 428/516, 35, 512, 349, 428/220, 213; 526/96, 349; 156/244.11

[56] References Cited

U.S. PATENT DOCUMENTS

| | | | |
|---|---|---|---|
| 4,147,827 | 4/1979 | Breidt et al. | 428/913 |
| 4,197,150 | 4/1980 | Breidt et al. | 428/349 |
| 4,303,709 | 12/1981 | Olson | 428/516 |

FOREIGN PATENT DOCUMENTS 1440317 of 0000 United Kingdom ............... 428/516

*Primary Examiner*—George F. Lesmes
*Assistant Examiner*—E. Rollins Buffalow
*Attorney, Agent, or Firm*—Alexander J. McKillop; Michael G. Gilman; James P. O'Sullivan, Sr.

[57] ABSTRACT

The present invention relates to heat sealable laminar thermoplastic films which may be heat sealed over a wide range of temperatures. The resultant heat seals exhibit a high heat seal strength. Such laminar structures comprise at least two layers of thermoplastic film, one of the layers being an oriented base layer and the other layer a heat sealable skin layer. Preferably the base layer is an alpha olefin such as polypropylene or copolymers thereof and the skin layer is preferably a linear, low-density polyethylene copolymer, comprising ethylene which has been copolymerized with another alpha olefin in the presence of a stereospecific catalyst.

2 Claims, No Drawings

ORIENTED POLYPROPYLENE WITH LINEAR LOW DENSITY POLY-ETHYLENE COPOLYMER COATING

This is a continuation of application Ser. No. 65,773 filed Aug. 13, 1979 which in turn is a continuation-in-part of U.S. Ser. No. 860,350 filed Dec. 14, 1977 both now abandoned.

BACKGROUND OF THE INVENTION

1. Field of the Invention

The present invention relates to laminar thermoplastic structures characterized by having a base layer and a heat sealable skin layer which may be formed by coextrusion of molten polymer layers through a common die orifice; by extrusion coating one layer onto the solid surface of a second layer; by adhesively bonding the individual layers together; or by utilizing heat welding techniques to form the desired laminate structure.

2. Description of the Prior Art

In packaging applications using thermoplastic films, for example polypropylene, it is usually necessary to seal the film during the packaging operation. This may be accomplished by using adhesives or by using heat sealing techniques; the particular sealing technique chosen may depend on the properties of the thermoplastic films, the packaging application and the packaging technique being used.

The use of heat sealing techniques on oriented film may result in the loss of orientation in the vicinity of the heat seal. Heat sealed oriented films may therefore exhibit inferior and unacceptable film appearance and properties. In order to heat seal oriented film and obtain acceptable product properties, it may be necessary to apply to the oriented film a coating or laminar layer which has a melting point which is less than the de-orientation temperature of the oriented film to allow heat sealing of the thus coated oriented film at a sealing temperature which is also less than the de-orientation temperature of the oriented film. The application of the heat sealable laminar layer to the base oriented film may be accomplished utilizing various techniques including melt extrusion of the heat sealable layer onto a preformed oriented base web, employing adhesive materials, or heat welding of the individual layers together. Preferred techniques are coextrusion of the individual layers followed by biaxial stretching of the multilayer sheet so formed, or alternately, extrusion coating of the heat sealable layer onto at least one surface of the longitudinally oriented solid substrate layer followed by stretching in the transverse direction.

In the past, coextruded oriented films have been prepared in which the oriented polypropylene core is coated with skins comprising an ethylene-propylene random copolymer containing minor amounts of ethylene. Such laminar films exhibit high heat seal strengths, but because of the relatively high melting point of the copolymer skin, i.e., on the order of from about 285° F. to about 305° F., the temperature range over which usable heat seals may be formed, is narrow.

Similarly, in the past, coextruded oriented films have been prepared wherein the core is an oriented polypropylene and the skin layers are comprised of low density polyethylene which has been polymerized utilizing conventional free radical-catalyzed processes. In the case of such laminates, because of the lower melting point of the low density polyethylene skin resin than that of the hereinabove described ethylene-propylene copolymer skins, a broader sealing range is achieved. However, the seal strength provided by skins comprised of such polyethylene homopolymer which has been polymerized by a free radical-catalyzed process are not as high as those provided by an ethylene-propylene random copolymer skin. Moreover, the haze and gloss values of such films are poorer than the haze and gloss values exhibited by oriented polypropylene films.

The present invention provides for the manufacture of an oriented film laminate comprising the steps of bringing together, in face to face engagement, a base web such as polypropylene and a second layer which has a lower melting point than the polypropylene and, subsequently, orienting the combination at a temperature below the melting point of the base polypropylene film.

The low melting skin resins of the present invention are preferably polyethylene copolymers and particularly linear low density polyethylene copolymers. The contemplated copolymers comprise at least 90% by weight of ethylene.

Commercial polyethylenes are sold as two distinct products, low density polyethylene and high density polyethylene. Low density polyethylene is manufactured by a high-pressure, high temperature, free radical catalyzed process. Commercially available low (to medium) density polyethylene resins have densities in the range of 0.910–0.939 gram/cc. Sometimes these resins are referred to as branched polyethylenes because the polymer chain contains "branches".

High density polyethylene resins, i.e., resins having densities ranging up to about 0.970 gram/cc. are manufactured at lower pressures and temperatures via heterogeneous ionic catalytic processes, for example, those utilizing an organometallic or a transition metal oxide catalyst. The products are linear, non-branched polyethylene.

To reduce the density of such high density polyethylene resins below the range of densities that are normally produced in such processes, another alpha-olefin or co-monomer, may be copolymerized with the ethylene. If enough co-monomer is added to the chain to bring the density down to 0.910–0.939 gram/cc., then such products are known as linear, low density polyethylene copolymers. Because of the difference of the structure of the polymer chains, branched low density and linear, low density polyethylene have different properties even though their densities may be similar.

For example, a comparison of the properties of film made from a linear low density polyethylene of resin density 0.922 with those of film made from a high pressure low density polyethylene of resin density 0.920 shows the former to have a higher modulus, yield strength, tensile strength and elongation at break, impact strength, and tear strength than the latter.

Linear low density polyethylene copolymers may be prepared utilizing the process, for example, as described in U.S. Pat. No. 3,645,992 and 4,011,382, the disclosures of which are incorporated herein by reference. Such copolymers may have densities ranging from about 0.900 up to about 0.925 for low density polymers and from about 0.926 up to about 0.939 for medium density polymers. The co-monomer which is copolymerized with the polyethylene is preferably an alpha-olefin having from about 3 up to about 10 carbon atoms. The density of the ethylene copolymer is primarily regulated by the amount of the co-monomer which is copolymerized with the ethylene. In the absence of the comonomer, the ethylene would homopolymerize in the presence of a stereospecific catalyst to yield homopolymers having a density equal to or above 0.95. Thus, the addition of progressively larger amounts of the comonomer to the ethylene monomer, results in a progressive lowering, in approximately a linear fashion, of the density of the resultant ethylene copolymer.

SUMMARY OF THE INVENTION

The present invention provides heat sealable thermoplastic laminates which exhibit high heat seal strengths as well as broad heat seal temperature ranges. The laminate comprises a biaxially oriented polypropylene film base layer having external skin layers of a linear, low density copolymer of ethylene and another terminally unsaturated hydrocarbon monomer that has been polymerized in the presence of a stereospecific catalyst. Such ethylene copolymer skin layers preferably have a density of less than about 0.940.

DESCRIPTION OF SPECIFIC EMBODIMENTS

As hereinbefore described, the present invention is directed to the manufacture of an oriented polypropylene film that is heat sealable over a wide range of temperatures, such films additionally exhibiting a high level of heat seal strength. This may be accomplished by laminating, for example by coextrusion, a polypropylene core layer to one or more surface layers comprising a linear low-density copolymer, such copolymer comprising ethylene and another terminally unsaturated hydrocarbon monomer, such monomers having been polymerized in the presence of an organo-metallic catalyst such as, for example, a Ziegler type catalyst commonly employed in the low pressure polymerization process for the production of high density polyethylene homopolymers. Following coextrusion, the resultant laminar sheet may be oriented by any of the means for film orientation common in the prior art.

Another alternate method for the manufacture of the laminar films of the present invention comprises extruding a polypropylene core layer and, after cooling and solidifying the resultant sheet, stretching it in the machine or longitudinal direction by passage over heated rolls driven at differential speeds in a manner well known in the prior art. After machine direction orientation, the sheet is then extrusion-coated on at least one surface with the aforedescribed copolymer and is finally stretched in the transverse direction. A particular advantage accruing to this method of manufacture of the laminates of the present invention is that the lower-melting copolymer surface layer is not required to contact the heated machine direction orientation rolls, thereby precluding any possibility of undesirable sticking of the sheet to said rolls.

Although a wide variety of well known prior art techniques may be provided to produce the desired base laminar film and subsequently orient the base film, for the purposes of description of particular embodiments of the present invention, the subject laminar films were prepared in accordance with the following procedure. The ethylene copolymer skin and polypropylene core resins were first separately formed into individual square plaques, 2⅜ inches by 2⅜ inches, having a core thickness of about 26 to 28 mils and skin thicknesses of about 2 to about 10 mils. A composite, two ply structure was then assembled by joining the particular skin and core materials by heat sealing around the perimeter of the assembly. The purpose of this heat sealing step was simply to ensure that the two plies did not become accidentally separated during handling and prior to orientation of the assembly. Biaxial orientation was accomplished by stretching the two ply assembly on a stretching apparatus manufactured by the T. M. Long Company.

This apparatus essentially consists of an oven enclosing a rectangular stretching frame, the opposing sides of which can be caused to move apart while still retaining the rectangular configuration. Each side of the stretching frame is fitted with a plurality of pneumatically actuated pistons whose function it is to grip the sample plaque around its perimeter thereby transmitting to the sample the force required to stretch it. In practice, the sample is introduced into the stretching frame, gripped by the pneumatically actuated pistons, and heated to the desired temperature. It is then stretched to the desired extent and at the desired rate in either or both directions. Heat sealing of the oriented laminar film structures was carried out by sealing the non-polypropylene surfaces of two such oriented laminar films together utilizing a sealing pressure of about 5 p.s.i. and a dwell time of 2.0 seconds.

EXAMPLE 1

A 10 mil compression molded plaque of a copolymer of ethylene and 4-methylpentene-1 which comprised 2.0% by weight of 4-methylpentene-1, the copolymer resin having a melt index of 3.0 and a density of 0.925 gram/cc. and which was prepared utilizing a polymerization process which employed a stereospecific catalyst; and a 27 mil compression molded plaque of polypropylene resin, having a density of 0.905 gram/cc. and a melt flow rate of 4.5 were assembled by heat sealing around the periphery of the plaques as described above. The assembly was subsequently inserted into the T. M. Long stretching apparatus and following preheating for about 1 minute at 312° F., was first stretched 5 times at a rate of about 25,000 percent per minute and then was stretched 7 times in a perpendicular direction to the first stretch at the rate of about 3,600 percent per minute. The heat seal properties of the film prepared in accordance with Example 1 as well as the properties of the films prepared in accordance with the succeeding examples including the prior art films are set forth in the following Table.

EXAMPLE 2

The procedure of Example 1 was followed except that the skin resin was a copolymer of ethylene and about 1.07% by weight of 4-methylpentene-1 having a density of 0.935 g/cc. and a Melt Index of 3.0.

EXAMPLE 3

The procedure of Example 2 was followed except that the compression molded plaque of the ethylene-4-methylpentene-1 copolymer skin resin was 2-3 mils in thickness.

EXAMPLE 4

The procedure of Example 3 was followed except that the skin resin was a copolymer of ethylene and octene-1 which was polymerized with a stereospecific catalyst (0.919 density, 6.0 Melt Index).

EXAMPLE 5

The procedure of Example 3 was followed except that the skin resin was a copolymer of ethylene and octene-1 which was polymerized with a stereospecific catalyst and that contained 2.5% octene-1 (0.921 density, 2.0 Melt Index).

PRIOR ART EXAMPLES

EXAMPLE 6

The procedure of Example 3 was followed except that the skin was a polyethylene homopolymer that was produced by the high pressure, free radical-catalyzed process (0.935 density, 3.0 Melt Index).

EXAMPLE 7

The procedure of Example 3 was followed except that the skin resin was a polyethylene homopolymer that was produced by the high pressure, free radical-catalyzed process (0.920 density, 0.3 Melt Index).

EXAMPLE 8

The procedure of Example 1 was followed except that the skin resin comprised a random copolymer of ethylene and propylene (3.0% ethylene, 4.5 Melt Flow Rate, 0.905 density).

TABLE 1

| Film of Example | Heat Seal Strength After Sealing At | | | | | |
|---|---|---|---|---|---|---|
| | 250° F. | 260° F. | 270° F. | 280° F. | 290° F. | 295° F. |
| 1 | 100 | 472 | 495 | 680 | 803 | — |
| 2 | 0 | 175 | 558 | 750 | 1188 | — |
| 3 | 13 | 285 | 453 | 525 | 568 | — |
| 4 | 60 | 394 | 457 | 565 | 652 | — |
| 5 | 15 | 158 | 468 | 505 | 537 | — |
| 6 | 3 | 18 | 235 | 273 | 395 | — |
| 7 | 0 | 8 | 25 | 223 | 215 | — |
| 8 | 0 | 0 | 0 | 0 | 200 | 600 |

In Table 1 there is set forth heat seal data which was obtained on the films produced in accordance with Examples 1 through 8 inclusive. It will be noted that the films of the present invention, i.e. Examples 1 through 5 inclusive, provide a much broader heat seal range than did the prior art film of Example 8, in which the skin layer of the laminate was constituted by an ethylene-propylene copolymer. It will be further noted that the films of the present invention provided not only a broader sealing range but also higher heat seal strengths than the prior art films of Examples 6 and 7 in which the outer laminar skins consisted of polyethylene resins that had been polymerized utilizing the free-radical catalyzed process of the prior art.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An oriented laminar thermoplastic film comprising a base layer consisting essentially of polypropylene having at least one side thereof coated with an extruded layer consisting of a linear low density copolymer of ethylene and octene-1, siad copolymer having at least 90% by weight of ethylene and a density of from about 0.900 up to about 0.925, wherein said film is prepared by extrusion coating a layer of said copolymer onto at least one surface of a sheet of machine direction oriented polypropylene and then orienting the resultant multilayer sheet in the transverse direction.

2. A laminar thermoplastic film in accordance with claim 1 wherein said layer of said copolymer comprises from about 2% up to about 10% of the total thickness of said laminar film.

* * * * *